US012666112B2

(12) United States Patent
Taikin et al.

(10) Patent No.: US 12,666,112 B2
(45) Date of Patent: Jun. 23, 2026

(54) SYSTEMS, METHODS AND COMPUTER PROGRAM PRODUCTS FOR DETECTING AND DISPLAYING SELECTABLE NETWORKED DEVICES BASED ON PROXIMITY OR SIGNAL STRENGTH

(71) Applicant: Spotify AB, Stockholm (SE)

(72) Inventors: Jevgeni Taikin, Solna (SE); Tomas Gustav Nilsson, Stockholm (SE); Rafael Lucena Araujo, Stockholm (SE)

(73) Assignee: Spotify AB, Stockholm (SE)

( * ) Notice: Subject to any disclaimer, the term of this patent is extended or adjusted under 35 U.S.C. 154(b) by 88 days.

(21) Appl. No.: 18/323,044

(22) Filed: May 24, 2023

(65) Prior Publication Data
US 2024/0397162 A1 Nov. 28, 2024

(51) Int. Cl.
| | |
|---|---|
| *H04N 7/18* | (2006.01) |
| *H04N 21/41* | (2011.01) |
| *H04N 21/431* | (2011.01) |
| *H04N 21/485* | (2011.01) |

(52) U.S. Cl.
CPC ....... *H04N 21/485* (2013.01); *H04N 21/4104* (2013.01); *H04N 21/431* (2013.01)

(58) Field of Classification Search
CPC ............. H04N 21/485; H04N 21/4104; H04N 21/431; H04N 21/4108; H04N 21/43637; H04N 21/43615; H04N 21/4524; H04L 2012/2849; H04L 12/2834; H04L 67/52
See application file for complete search history.

(56) References Cited

U.S. PATENT DOCUMENTS

| | | | | |
|---|---|---|---|---|
| 8,302,166 | B2 * | 10/2012 | Balakrishnan .......... | H04W 4/02 |
| | | | | 455/418 |
| 9,781,565 | B1 * | 10/2017 | Folco .................... | H04W 4/027 |
| 11,552,843 | B2 * | 1/2023 | Griffiths .............. | H04L 41/0806 |
| 2011/0069940 | A1 * | 3/2011 | Shimy ................ | H04N 21/4532 |
| | | | | 386/296 |
| 2014/0282071 | A1 * | 9/2014 | Trachtenberg ........ | G06F 3/0484 |
| | | | | 715/748 |

(Continued)

FOREIGN PATENT DOCUMENTS

| | | |
|---|---|---|
| EP | 3968649 B1 | 8/2023 |

OTHER PUBLICATIONS

Srivatsan Sridhar, "Android is getting spotify connect support in media switcher, cross-device switching", located online: https://www.fonearena.com/blog/382323/android-spotify-connect-cross-device-switching.html, Jan. 6, 2023, 5 pages.

(Continued)

*Primary Examiner* — Annan Q Shang
(74) *Attorney, Agent, or Firm* — McDonnell Boehnen Hulbert & Berghoff LLP

(57) ABSTRACT
An architecture is provided for displaying a list of connected devices by generating a first list of devices connected to the same local network and scanning for devices within a defined physical range of a media playback device. A second list of devices within the defined physical range is generated and compared to the first list to create a third list of devices with overlapping identifiers. The media playback device then displays the third list of devices on its interface according to proximity for the user to select an appropriate device for media playback.

20 Claims, 6 Drawing Sheets

(56) References Cited

U.S. PATENT DOCUMENTS

| | | | |
|---|---|---|---|
| 2017/0055040 A1* | 2/2017 | Volkman | H04N 21/4826 |
| 2017/0289785 A1 | 10/2017 | Krishnakumar | |
| 2020/0201495 A1* | 6/2020 | Coffman | G06F 3/167 |
| 2021/0185365 A1 | 6/2021 | Chan | |
| 2022/0086597 A1* | 3/2022 | Chandel | H04B 17/318 |
| 2022/0286356 A1 | 9/2022 | Shoesmith et al. | |
| 2024/0259277 A1* | 8/2024 | Chou | H04L 67/51 |

OTHER PUBLICATIONS

Pavel Kriz et al., "Improving indoor localization using bluetooth low energy beacons", located online: https://www.hindawi.com/journals/misy/2016/2083094/, Hindawi Publishing Corp., Apr. 18, 2016, 12 pages.

Business Standard News, "Google working on cross-device playback system features, says report", located online: https://www.business-standard.com/article/technology/google-working-on-cross-device-playback-system-features-says-report-123010600598_1.html, last updated Jan. 6, 2023, 7 pages.

Bassbouss Louay: "Concepts and models for creating distributed multimedia applications and content in a multiscreen environment", Jan. 1, 2020 (Jan. 1, 2020), XP093097585, DOI: 10.14279/depositonce-9851.

Extended European Search Report, European Patent Application No. 24178016.2, mailed Oct. 2, 2024.

* cited by examiner

SYSTEMS, METHODS AND COMPUTER PROGRAM PRODUCTS FOR DETECTING AND DISPLAYING SELECTABLE NETWORKED DEVICES BASED ON PROXIMITY OR SIGNAL STRENGTH

TECHNICAL FIELD

Example embodiments described herein relate generally to media content playback devices and proximity and signal strength sensing, and more particularly to detecting and displaying selectable networked devices based on their proximity or signal strength relative to a media playback device.

BACKGROUND

A media playback device application is a software program that enables a device to play media content, such as music, video, or audio files. Examples of media playback devices include smartphones, tablets, computers, and dedicated media players such as smart TVs, streaming boxes, and home theater systems. Media playback device applications can vary in features and capabilities, but they generally provide users with the ability to browse and select media files, create playlists, control playback, adjust audio and video settings, and interact with other devices or streaming services.

Many media playback device applications also support wireless streaming, which allows users to cast or transmit the playback of media content from one device to another over a network, such as via Bluetooth, Wi-Fi, or AirPlay. This allows users to enjoy their media content on a larger screen or better audio system, or to share media with others in the same room or remotely.

One challenge for users while transmitting or transferring media content to other devices is selecting the most suitable device such as the nearest device. One technical problem in doing so is that when devices are connected by a network, there is no physical distance data provided. Thus, a device on the same network may appear at the top of the list of devices that can play media content when that device is in fact too far to even hear. Moreover, too many devices that are on the same network could be listed making it challenging to select the most appropriate one.

There exist various network protocols and mechanisms for broadcasting a device's presence on a local network, such as Address Resolution Protocol (ARP), Simple Service Discovery Protocol (SSDP), Bonjour (formerly known as Zeroconf), and Universal Plug and Play (UPnP).

Address Resolution Protocol (ARP): When a device communicates with another device on the same local network, it can use ARP to discover a Media Access Control (MAC) address of a target device. The ARP protocol broadcasts an ARP request packet to all devices on the local network, asking the device with the target IP address to respond with its MAC address.

Simple Service Discovery Protocol (SSDP): SSDP is a network protocol used for discovering and advertising network services. Devices that support SSDP can announce their presence on the network by sending SSDP discovery packets to a multicast address. Other devices on the network can listen for these packets and discover the available services.

Bonjour (formerly known as Zeroconf): Bonjour is a set of networking protocols that enables automatic discovery of devices and services on a local network. Devices that support Bonjour can advertise their services using multicast Domain Name System (mDNS) and multicast DNS Service Discovery (DNS-SD) protocols.

Universal Plug and Play (UPnP): UPnP is a set of networking protocols that enables devices to discover and interact with each other on a local network. Devices that support UPnP can advertise their services and capabilities by broadcasting discovery messages using the Simple Service Discovery Protocol (SSDP).

A collaborative media consumption session application enables two or more users to share their viewing or listening experience in real-time, regardless of their location. With this application, users can invite additional users to join a media consumption session for watching or listening to the same media content simultaneously. Everyone or a number of selected users in the session can also control playback, add or remove tracks from the playback queue, and even contribute to a collaborative playlist associated with the session. However, a typical collaborative media consumption session application has a similar issue as described above. If a user wants to start a collaborative media consumption session in a university dormitory building, for example, but wishes only to share the collaborative media consumption session with friends in their particular dorm room, the user's device will likely display too many available devices that are on the same network, making selecting the nearest device(s) difficult and time-consuming.

The reason for this is that the conventional methods of presenting other devices to users can only display devices on the same network or nearby devices without considering the distance between them. "Ultra Wideband" (UWB) is a type of wireless communication technology that uses low-energy, short-range radio waves to transmit data over short distances. It allows devices to communicate with each other and exchange information about their physical location and proximity. However, UWB has not been used in conjunction with network topology information or network inventory information to present the most likely best options of networked devices to select. Therefore, what is needed is an architecture that enables a media playback device to provide users with a list of only the most appropriate networked devices from which they can select.

SUMMARY

The example embodiments described herein meet the above-identified needs by providing methods, systems and computer program products for displaying a listing of connected devices, comprising: generating a first list of device metadata including at least a device identifier, wherein the first list of device metadata corresponds to devices that are connected to the same local network and enabled to stream media content items; scanning, by a media playback device, for one or more devices within a predefined physical range of the media playback device; generating a second list of device metadata including at least a device identifier, wherein the second list of device metadata corresponds to one or more devices within the predefined physical range; generating a third list of device metadata corresponding to an overlap of at least one or more device identifiers included in the first list of device metadata and the second list of device metadata, the third list of device metadata including the at least one or more device identifiers corresponding to the overlap; and displaying, via a display interface of the media playback device, at least a portion of the third list of device metadata.

In some embodiments, the method further comprises: communicating the first list of device metadata and the second list of device metadata to a device aggregator that is remote from the media playback device, wherein the device aggregator is implemented in one of (i) an edge device, (ii) a remote server, or (iii) a middleware component; and receiving, by the media playback device from the device aggregator, the third list of device metadata.

In some embodiments, the third list of device metadata is ordered based on one or more received signal strength detectors corresponding to the one or more devices within the predefined physical range in the second list of device metadata.

In some embodiments, each of the one or more devices within the predefined physical range is any one of (i) a Bluetooth (BT) enabled device, (ii) an ultra-wideband (UWB) enabled device, or (iii) a combination of (i) and (ii), and wherein the third list of device metadata is ordered based on one or more received signal strength detectors corresponding to the one or more BT enabled devices and the one or more UWB enabled devices in the second list of device metadata.

In some embodiments, the predefined physical range is adjustable via a user interface of the media playback device.

In some embodiments, the device identifier in the first list of device metadata and the second list of device metadata is (i) a device name, (ii) an Internet Protocol (IP) address, (iii) a location identifier, or (iv) a unique identifier other than (i), (ii) or (iii).

In some embodiments, the third list of device metadata includes a device characteristic.

In some embodiments, the method further comprises: receiving a selection of a device identified from the third list of metadata displayed on the display interface of the media playback device, thereby receiving a selected device; and establishing a connection between the media playback device and the selected device for media playback.

In some embodiments, the method further comprises: receiving a selection of a device identified from the third list of metadata displayed on the display interface of the media playback device, thereby receiving a selected device; communicating the selection to a media delivery system; and establishing a connection between the selected device and the media delivery system for media playback.

In some embodiments, the first list of device metadata is in a first sequence; the second list of device metadata is in a second sequence, the second sequence being at least in part different from the first sequence; and the third list of device metadata ordered based on the second sequence.

In yet another embodiment, a system is provided for displaying a listing of connected devices, comprising: one or more processors; and memory storing one or more programs including instructions configured to be executed by the one or more processors and causing the one or more processors to: generate a first list of device metadata including at least a device identifier, wherein the first list of device metadata corresponds to devices that are connected to the same local network and enabled to stream media content items; scan, by a media playback device, for one or more devices within a predefined physical range of the media playback device; generate a second list of device metadata including at least a device identifier, wherein the second list of device metadata corresponds to one or more devices within the predefined physical range; generate a third list of device metadata corresponding to an overlap of at least one or more device identifiers included in the first list of device metadata and the second list of device metadata, the third list of device metadata including the at least one or more device identifiers corresponding to the overlap; and display, via a display interface of the media playback device, at least a portion of the third list of device metadata.

In some embodiments, the one or more programs of the system further include instructions for causing the one or more processors to: communicate the first list of device metadata and the second list of device metadata to a device aggregator that is remote from the media playback device, wherein the device aggregator is implemented in one of (i) an edge device, (ii) a remote server, or (iii) a middleware component; and receive, by the media playback device from the device aggregator, the third list of device metadata.

In some embodiments of the system the third list of device metadata is ordered based on one or more received signal strength detectors corresponding to the one or more devices within the predefined physical range in the second list of device metadata.

In some embodiments of the system, each of the one or more devices within the predefined physical range is any one of (i) a Bluetooth (BT) enabled device, (ii) an ultra-wideband (UWB) enabled device, or (iii) a combination of (i) and (ii), and the third list of device metadata is ordered based on one or more received signal strength detectors corresponding to the one or more BT enabled devices and the one or more UWB enabled devices in the second list of device metadata.

In some embodiments of the system, the predefined physical range is adjustable via a user interface of the media playback device.

In some embodiments of the system, the device identifier in the first list of device metadata and the second list of device metadata is (i) a device name, (ii) an Internet Protocol (IP) address, (iii) a location identifier, or (iv) a unique identifier other than (i), (ii) or (iii).

In some embodiments of the system, the third list of device metadata includes a device characteristic.

In some embodiments of the system, the one or more programs further include instructions for causing the one or more processors to: receive a selection of a device identified from the third list of metadata displayed on the display interface of the media playback device, thereby receiving a selected device; and establish a connection between the media playback device and the selected device for media playback.

In some embodiments of the system, the one or more programs further include instructions for causing the one or more processors to: receive a selection of a device identified from the third list of metadata displayed on the display interface of the media playback device, thereby receiving a selected device; communicate the selection to a media delivery system; and establish a connection between the selected device and the media delivery system for media playback.

In some embodiments, the first list of device metadata is in a first sequence; the second list of device metadata is in a second sequence, the second sequence being at least in part different from the first sequence; and the third list of device metadata ordered based on the second sequence.

In some embodiments, a non-transitory computer-readable medium having stored thereon sequences of instructions is provided, where the sequences of instructions include instructions which when executed by a computer system causes the computer system to perform the operations and processes described herein.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments presented herein are directed to methods, systems and computer program products for displaying a listing of networked devices based on their physical proximity to a media playback device, which are now described herein in terms of an example media playback device and example networked-devices that are BLU-ETOOTH (BT) enabled devices that can detect proximity based on signal strength. This description is not intended to limit the application of the embodiments presented herein. In fact, after reading the following description, it will be apparent to one skilled in the relevant art(s) how to implement the following example embodiments in alternative embodiments e.g., involving any technology of detecting physical proximity such as ULTRA-WIDEBAND (UWB) or GPS (Global Positioning System) technology. Physical proximity is sometimes referred to as proximity for simplicity.

Generally, aspects of the embodiments presented herein provide several advantages over existing methods for displaying a listing of connected devices. By taking into account the proximity of connected devices, a media playback device can display a more relevant and useful list of available devices. This can save users time and frustration in trying to identify and connect to devices that may be out of range or not enabled to receive media content. Additionally, aspects of the embodiments described herein also can improve the scalability and flexibility of connected devices, making it suitable for media content playback in a wide range of environments and settings.

Figure 1:
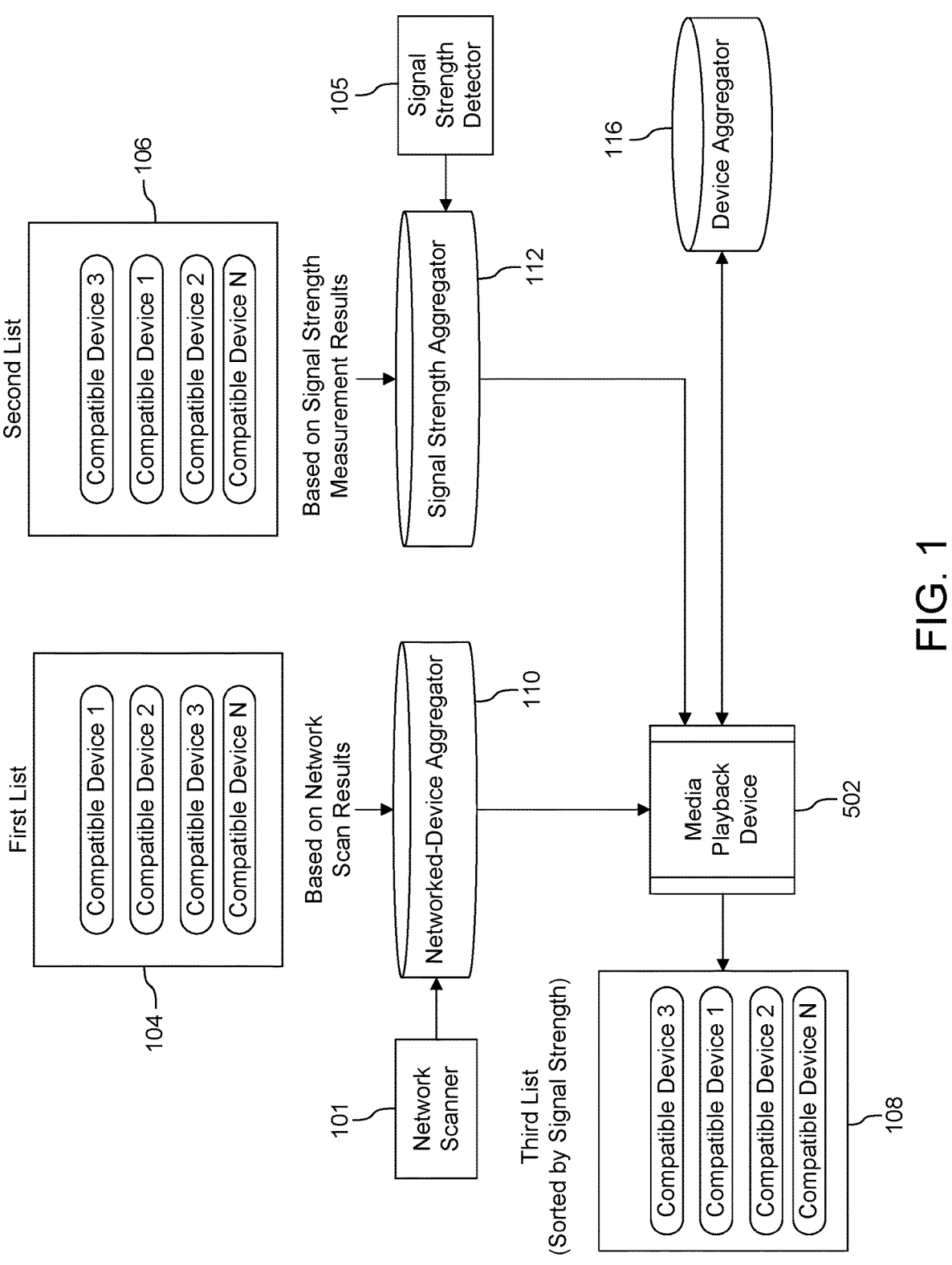
FIG. 1 illustrates a system-flow diagram of an architecture for displaying a listing of networked devices, according to an example embodiment.

FIG. 1 illustrates a system-flow diagram of an architecture for displaying a listing of networked devices, according to an example embodiment. In some embodiments, the system includes a media playback device 502 that includes a network scanner 101, a signal strength detector 105, a networked-device aggregator 110, and a signal strength aggregator 112. In some embodiments, media playback device 502 is in communication with any one or a combination of network scanner 101, signal strength detector 105, networked-device aggregator 110, and signal strength aggregator 112.

Networked-device aggregator 110 operates to store a first list of device metadata 104 including at least a device identifier. The first list of device metadata 104 corresponds to devices that are connected to the same local network as the media playback device 502 and are enabled to stream media content items. In an example embodiment, the devices that are connected to the same local network are detected by network scanner 101.

The network scanner 101 may use various techniques to identify devices on the local network, such as using the Internet Protocol (IP) address range of the network, or by sending broadcast messages to identify devices that are connected to the network. The network scanner 101 can be either hardware or software or both hardware and software, depending on the specific implementation. In some cases, the network scanner 101 is a physical component built into a device's hardware, such as a radio or antenna that is designed to detect and analyze signals from Wi-Fi networks. These hardware components are responsible for capturing the signals and providing them to the device's software for processing.

In other cases, the network scanner 101 is a software application that runs on the device's operating system, using the device's built-in hardware components to scan for nearby networks. The software may also provide additional functionality such as analyzing network signal strength, detecting open networks, and displaying network names and security information.

The media playback device may also run a so-called connect application that connects devices that also support the connect application. When two or more devices use a particular application, such as the connect application, to communicate with each other, they can be referred to as compatible devices. As used herein, "compatible devices" or "devices", unless otherwise specified, generally means devices that are able to communicate with each other because they use the same application or technology. The media playback device 502 for example, is a compatible device when it runs such a connect application.

In an example implementation of a connect application run by the media playback device 502, the connect application first performs a discovery operation to discover compatible devices on the local network (e.g., using Address Resolution Protocol (ARP), Simple Service Discovery Protocol (SSDP), Bonjour, and Universal Plug and Play (UPnP)). When a compatible device is discovered, its IP address is obtained so that the connect application in both the compatible device and the media playback device 502 can communicate.

In some implementations, once a compatible device has been discovered, the connect application sends an authentication request to a remote server. The authentication request from the compatible device includes a unique identifier for the device, which is generated based on its hardware and software characteristics. This unique identifier is used to verify that the compatible device can connect using the connect application. In some embodiments, for example during the authentication process or afterwards, the connect application sends account information of a user logged into the connect application. In some embodiments, the unique identifier includes at least one or more of an IP address, a device type, a manufacturer name, an embedded OS version, wireless compatibilities, and the like.

Once the device has been authenticated by the remote server, the remote server sends a handshake signal to the device. This handshake signal contains information about the audio stream that the device will be receiving, such as the audio format, bitrate, and encryption keys. The device, in turn, acknowledges the handshake signal and prepares to receive the media content (e.g., audio or video) stream.

With the handshake process complete, the connect application on media playback device 502 can start streaming media content data directly to the other device. This is done using, for example, a peer-to-peer streaming protocol.

While media content is streaming to the device, the connect application on the media playback device 502 can, in some embodiments, still control playback. This is done using, for example, a separate control protocol, which allows the connect application to cause different types of playback controls, such as pause, resume, skip tracks, and adjust the volume. The control protocol is also used to send metadata about the currently playing track, such as the title, artist, and album artwork.

The connect application, in some implementations, allows for multi-room playback, where you can play the same music on multiple devices at the same time. This is accomplished by creating a "group" of devices in the connect application and sending the audio stream to all of them simultaneously. The devices then synchronize their playback so that the music is synchronization across all of them.

Once the network scanner 101 has identified the devices on the local network, the media playback device 502 generates the first list of device metadata 104 for these devices. The first list of device metadata 104 may include various information about the connected devices, such as the device identifier, network address, network name, device type, and other relevant information that can be used to identify and categorize the connected devices. This first list of device metadata 104 is used to determine which devices are connected to the same local network and enabled to stream media content items.

In some embodiments, the media playback device 502 uses a signal strength detector 105 to perform a scan for one or more other devices within a predefined physical range. In some implementations, these devices may or may not be compatible devices. This scan is used by the media playback device 502 to generate a second list of device metadata 106 that includes the device identifiers of any devices that are found to be within the predefined physical range of the media playback device 502.

A BLE beacon is a small, low-power device that transmits Bluetooth Low Energy (BLE) signals to other devices within a particular range. BLE beacons are typically used to provide location-based services, such as indoor navigation or proximity-based applications. In some embodiments, a BLE beacon in the media playback device and other devices on the local network implement a BLE beacon for the purpose of determining the distance between two BLE-enabled devices. By measuring the signal strength of the beacon's signal, a BLE-enabled device can estimate its distance from the beacon and use this information to determine its location or trigger a specific action. BLE can use RSSI (Received Signal Strength Indicator) to estimate the distance between two devices. RSSI is a measurement of the power level of the received radio signal, which can be used to estimate the distance between two BLE-enabled devices because the signal strength decreases as distance increases.

To estimate the distance, the RSSI value is typically calibrated based on measurements taken at known distances between two devices. Calibrating RSSI, in some embodiments, involves adjusting signal strength readings to account for factors such as distance, interference, and other environmental conditions that can affect signal strength. Calibration can be performed to provide more accurate signal strength measurements, which are used for tasks such as location tracking and signal strength mapping. In example implementations, the model or methodology for RSSI calibration can be based on a predefined calibration policy or based on a predefined calibration policy set by a reference device within a BT connectivity range of the media playback device. Once the calibration process is completed, the RSSI value of a received signal can be used to estimate the distance between the two devices. This estimation can be done using a mathematical model such as the log-distance path loss model or the signal attenuation model.

The range of a BLE signal can vary depending on the environment, the specific devices involved, the version of BLE, and other factors that may cause interference. In addition, BLE can have predefined communication ranges (e.g., 10 meters (approximately 33 feet), 100 meters (approximately 330 feet) or more).

In an example implementation, the media playback device 502 and one or more devices within the predefined physical range are BLE-enabled devices. It should be understood, however, that the media playback device and other networked devices may use a variety of techniques to determine the physical range for the scan, including wireless communication protocols, such as Bluetooth or ultra-wideband (UWB), or by using location data from GPS or other sources. Other now known or future developed technology can be used to measure proximity between the media playback device and other devices on the local network.

The purpose of the scan performed by the signal strength detector 105 is to identify any devices that are in close enough proximity to the media playback device 502 to be potential targets for media streaming. By identifying these devices and including their device identifiers in the second list of device metadata 106, users can be presented with a relevant and up-to-date list of available devices for streaming media content items.

After generating the first list of device metadata 104 (devices connected to the same local network) and the second list of device metadata 106 (devices within a predefined physical range of the media playback device), a third list of device metadata 108 is generated. The third list of device metadata 108 corresponds to the overlap between the first list of device metadata 104 and the second list of device metadata 106.

This overlap is determined by identifying at least one or more device identifiers that are present in both the first list of device metadata 104 and the second list of device metadata 106. The third list of device metadata 108 includes these common device identifiers.

Once the third list of device metadata 108 is generated, at least a portion of this list is displayed on a display interface of the media playback device. The third list of device metadata 108 is, in an example embodiment, ordered based on one or more received signal strength detectors corresponding to the one or more devices within the predefined physical range in the second list of device metadata. This allows the user to see which compatible devices are both connected to the local network and within the physical range (e.g., within a BT or UWB communication range) of the media playback device 502. The user can then select a compatible device from a list generated from the third list of device metadata to stream or cast media content items or transmit the media content items, for example, by using a connect application as described above, or similar application.

In an example implementation, the first list of device metadata 104 is stored in a networked-device aggregator 110 (also referred to as a first aggregator) and the second list of device metadata 106 is stored in a signal strength aggregator 112 (also referred to as a second aggregator). In some embodiments, the media playback device 502 operates to determine the overlap between the first list of device metadata 104 and the second list of device metadata 106 and generate the third list of device metadata 108.

In some embodiments, the first list of device metadata 104 and the second list of device metadata 106 are communicated to a device aggregator 116 that is remote from the media playback device 502. In these embodiments, device aggregator 116 processes the first list of device metadata 104 and the second list of device metadata 106 by combining them into one single list, the third list of device metadata 108. The device aggregator 116 can be implemented in one of (i) an edge device, (ii) a remote server, or (iii) a middleware component. Device aggregator 116 is implemented as software, hardware or a combination of both software and hardware. In turn, media playback device 502 operates to receive from the device aggregator 116, the third list of device metadata 108.

In some embodiments, the media playback device 502 operates to check the network's availability before transmitting the first list of device metadata 104 and the second list of device metadata 106 to the remote server. If the network is unavailable, the media playback device 502 can generate the third list of device metadata 108 locally.

In some embodiments, once generated, the third list of device metadata 108 is encrypted and stored on the remote server. In an example implementation, the network's availability must be checked before transmitting the third list of device metadata 108 to the media playback device 502. Once the media playback device 502 receives the third list of device metadata 108, it can display the third list of device metadata 108 to a user via the user interface associated with the connect application.

In some embodiments, each of the one or more devices within the predefined physical range is any one of (i) a Bluetooth (BT) enabled device, (ii) an ultra-wideband (UWB) enabled device, or (iii) a combination of (i) and (ii), and the third list of device metadata 108 is ordered based on one or more received signal strength detectors corresponding to the one or more BT enabled devices and the one or more UWB enabled devices in the second list of device metadata.

In some embodiments, the predefined physical range is adjustable via a user interface of the media playback device 502. The adjustable predefined physical range feature is useful because it allows users to customize the range of devices that can be displayed. This can be especially helpful in situations where the user wants to limit the number of devices displayed, such as in a crowded area with many nearby devices, or in a situation where the user wants to ensure that only specific devices are displayed. By giving users the ability to adjust the range, the system can be tailored to specific user preferences and needs.

In some embodiments, the device identifier in the first list of device metadata and the second list of device metadata is (i) a device name, (ii) an Internet Protocol (IP) address, (iii) a location identifier, or (iv) a unique identifier other than (i), (ii) or (iii). Having different options for the device identifier in the first and second lists of device metadata provides flexibility and compatibility with different network configurations, protocols and available device features. For example, some networks or devices may use device names as identifiers while others may use IP addresses or unique identifiers. Additionally, including a location identifier as a device identifier can be useful in scenarios where devices are physically located in different areas and the user wants to select devices in a particular location, especially if the device has the capability of communicating its location.

Having multiple options for device identifiers increases the likelihood of successfully identifying and connecting to desired devices.

In some implementations, a location identifier of a device can be obtained indirectly through its associated 2.4 GHz or 5 GHz wireless router, or through third-party services. For example, in a multi-speaker playback use case, certain applications can display and manage a group of speaker devices. Location information may be provided by third-party applications and then included in the second list of device metadata 106.

"Device characteristic", as used herein, generally refers to a feature and capability of a client device (e.g., a media playback device) that can affect the quality and performance of media playback. Examples of client device characteristics include:

Display capabilities: the type of display capabilities of the client device,

Audio capabilities: the type of speaker or audio output capabilities/features of the client device, such as high fidelity, Dolby Atmos, or surround sound, Reproduction capabilities: the features of the client device that enable it to accurately reproduce the media being played, including factors such as frame rate, color accuracy, and dynamic range, Connectivity capabilities: the connectivity options of the client device, which can affect its compatibility with other devices and services. For example, Bluetooth connectivity can allow audio streaming to wireless headphones, and HDMI connectivity can enable connection to a TV or projector for larger screen playback and integration with sound systems.

Control and navigation: the features that affect the user experience of the client device, including a user-friendly interface, responsive buttons, and navigation options.

In some embodiments, the third list of device metadata 108 includes a device characteristic. The inclusion of device characteristic in the third list of device metadata 108 can be useful in several ways. For example, the device characteristic can provide additional information about the connected devices, which can help the user make an informed decision about which device to select for media playback. If the device characteristic indicates that a connected device supports a high-quality audio codec, for example, then the user may choose that device over other devices that do not support the same codec. Further, the device characteristic can be used to optimize media playback by selecting the device with the best characteristics for the content being played. For example, if the media playback device 502 is streaming high-resolution video content, the device with the highest resolution display capability and processing power can be selected. Overall, including device characteristics in the third list of device metadata 108 can enhance the user experience by providing more information and enabling better device selection and optimization.

Figure 2:
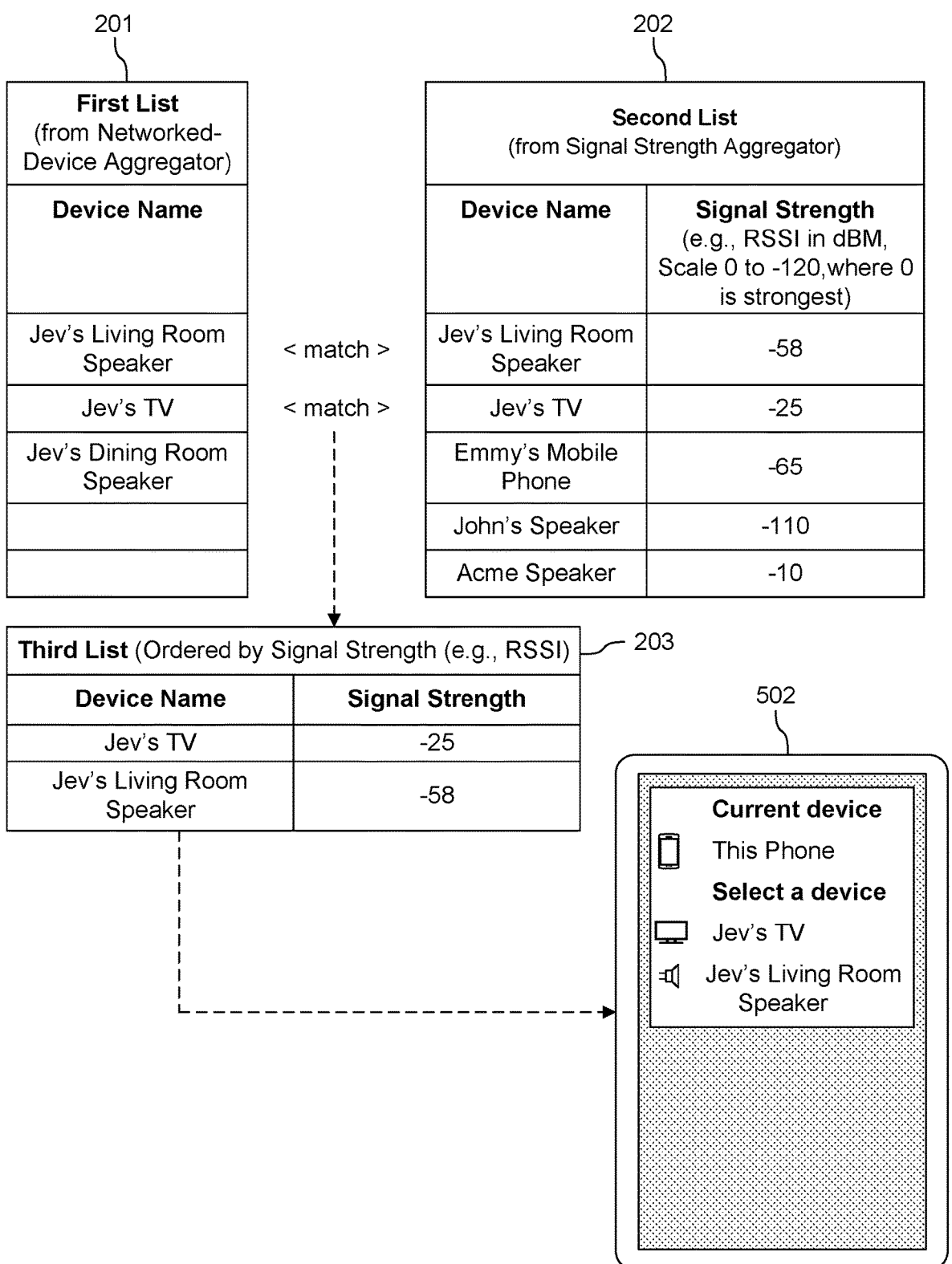
FIG. 2 illustrates an example listing of connected devices generated based on network-connected devices on the same network as a media playback device and their signal strength relative to their physical range of the playback device, according to an example embodiment.

In some embodiments, the media playback device 502 operates to receive a selection of a device identified from the third list of device metadata 108 displayed on the display interface of the media playback device 502. This gives a user the ability to select a device from a list of available devices that is displayed on the media playback device's interface. This is illustrated in FIG. 2, where the display of the media playback device 502 indicates the current device that is playing is the media playback device 502 itself. Available compatible devices within a predefined physical range that are selectable are also displayed. The device a user selects is referred to herein as a selected device. Once a device is selected, a connection can be established between the media playback device and the selected device for media playback. This feature allows the user to easily choose which device they want to use for media playback without having to search for the device or enter any complicated settings. For example, if a user wants to play a video from their media playback device on their smart television, they can use the method described above to generate a list of available devices in the vicinity that are capable of streaming the media content. The user can then select the smart television from the list of available devices and establish a connection between the media playback device and the smart television for media playback. This provides a convenient and user-friendly method for selecting the playback device and connecting it to the media playback device.

In some embodiments, a selection of a device identified from the third list of metadata displayed on the display interface of the media playback device 502 is selected but the selection is communicated by the media playback device 502 to a media delivery system. In turn, a connection between the selected device and the media delivery system is established for media playback. In some embodiments, the connection between the selected device and the media delivery system is established for media playback upon an authentication operation. For example, by authenticating the communicated selected device and establishing a connection. Once these criteria are met, the media delivery system begins streaming media content to the selected device. In some embodiments, the media playback can be controlled through the user interface of the media playback device 502 or through the user interface of the selected device. The connection between the selected device and the media delivery system may be terminated upon completion of the media playback, or upon the user's request to stop playback or switch to a different device.

Referring again to FIG. 1, in some embodiments, the first list of device metadata 104 is in a first sequence. Further, the second list of device metadata 106 is in a second sequence, where the second sequence is at least in part different from the first sequence. The third list of device metadata 108, in turn, is ordered based on the second sequence.

In some embodiments, the network scanner 101 scans for devices that are either on a Wi-Fi network or a wired network.

In some embodiments, the first list of device metadata 104 is stored in the networked-device aggregator 110, particularly in runtime memory of a local application of the media playback device 502.

In some embodiments, the third list of device metadata 108 is stored in the signal strength aggregator 112, particularly in runtime memory of a local application of the media playback device 502. In some embodiments the device identifiers in the third list of device metadata 108 are sorted based on the RSSI (received signal strength indicator, represented by dB).

FIG. 2 illustrates an example listing of connected devices generated based on network-connected devices on the same network as a media playback device 502 and their signal strength relative to their physical range of the playback device, according to an example embodiment. The network-connected devices that are connected to the media playback device are listed in a first list of device metadata 201. In this example embodiment, the device identifier is the device name. The first list of device metadata 201 includes three devices, "Jev's Living Room Speaker", "Jev's TV" and "Jev's Dining Room Speaker". In this example, the devices are connected to the same local network and are enabled to stream media content items. In an example embodiment, the first list of device metadata 201 are generated using network scanner 101 of FIG. 1.

A second list of device metadata 202 includes the device identifiers of devices that are located within the predefined physical range of the media playback device. In this example, the device identifiers are represented by the device names. As shown in FIG. 2, the second list of device metadata 202 includes the following device-name: signal-strength pairs: {Jev's Living Room Speaker: −58}, {Jev's TV: −25}, {Emmy's Mobile Phone: −65}, {John's Speaker: −110}, and {Acme Speaker: −10}. The signal strength is measured in dBM on a scale of 0 to −120, with 0 being the strongest.

A third list of device metadata 203 is generated by identifying the overlap between the first list of device metadata 201 and the second list of device metadata 202. In this example, the matching devices are Jev's Living Room Speaker and Jev's TV. Moreover, the device named Jev's TV has a stronger signal strength to the media playback device than the device named Jev's Living Room Speaker. Therefore, it is listed first in the third list of device metadata 203.

In turn, the device identifiers in the third list of device metadata 203 is presented on the output interface of the media playback device 502 such that any one of the compatible devices that are within a predefined physical proximity of the media playback device 502 can be selected to playback media content items.

Figure 3:
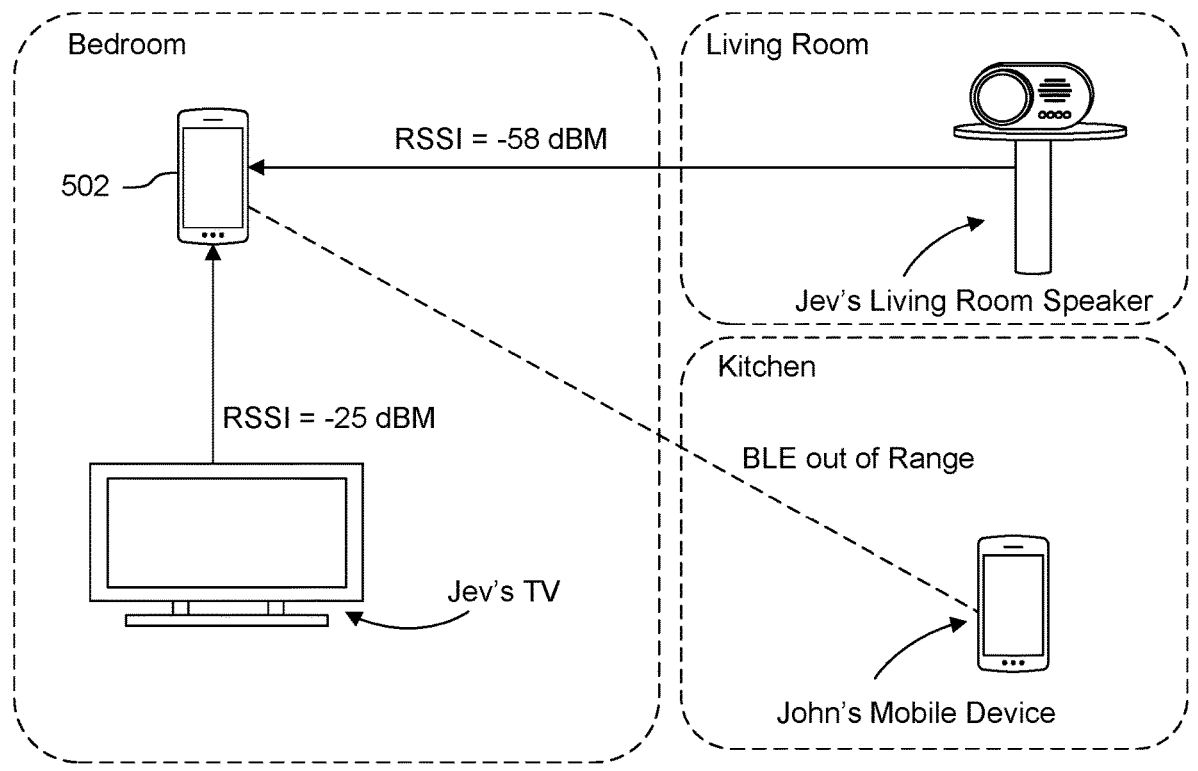
FIG. 3 depicts an example single user use case, according to an example embodiment.

FIG. 3 depicts an example single user use case, according to an example embodiment. In this example, there are three rooms, a bedroom, a living room, and a kitchen, each of which is separated from the others by walls, closed doors and/or distance. A user is in the bedroom running a media playback application executing the operations a media playback device 502 such as a mobile phone. In the bedroom there is located a television, named Jev's TV having a signal strength relative to the media playback device 502 of −25 dBM. In the living room, there is located a network-connected speaker device, named Jev's Living Room Speaker, having a signal strength relative to the media playback device 502 of −58 dBM. In the kitchen, there is a third media playback device, named John's Mobile Device having a signal strength that is either outside a predefined physical range or is too weak to be detected. Jev's TV, Jev's Living Room Speaker and John's Mobile Device are on all on the same local network (e.g., via Wi-Fi or wired).

In this example use case, John's Mobile Device is out of range and therefore may listed on the first list of device metadata 201 as being connected to the same local network as media playback device 502. But it will not be listed on the second list of device metadata 202. In this case John's Mobile Device will not be listed on the third list of device metadata 203 and hence not displayed on the media playback device 502 as a selectable option for transferring playback. As in the example of described above in connection with FIG. 2, Jev's TV has a stronger signal than Jev's Living Room Speaker, and therefore will be ordered higher on the third list of device metadata 203 and hence displayed higher on the list presented to the user via the display device of the media playback device 502.

Figure 4:
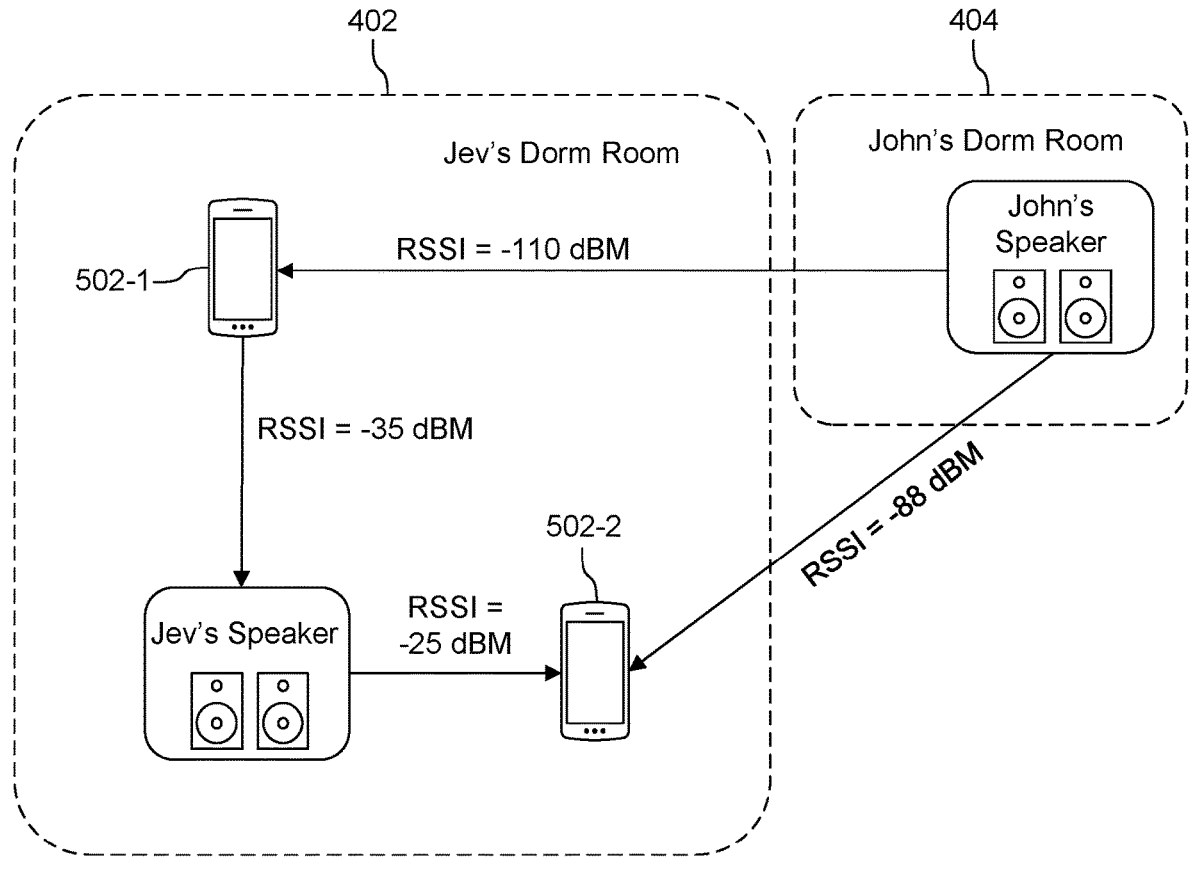
FIG. 4 depicts an example collaborative media consumption session use case, according to an example embodiment.

FIG. 4 depicts an example collaborative media consumption session use case, according to an example embodiment. It may be desirable to allows users to share and listen to the same music simultaneously with friends or family. In some embodiments, a collaborative media consumption session feature is provided that allows users to share control of a music queue and playback with several other people, allowing everyone in the session to add songs, skip tracks, or pause and play the music. To start a collaborative media consumption session, one person creates a session and shares a unique link with the others they want to join. Once everyone joins the session, they can start adding songs to the queue and listening together. It may be desirable to playback media content in a collaborative media consumption session, to allow users to playback media content (e.g., the same music) on multiple devices at the same time.

This is accomplished by creating a group of media playback devices that are to be included in the collaborative media consumption session and sending the audio stream to all of the media playback devices simultaneously. The devices then synchronize their playback so that the music is perfectly in sync across all of them. However, it may be the situation where a user wants to start a group session in, for example, a university dormitory building, and wishes to share the group session only with friends in their particular dorm room. The problem of displaying too many available devices on multiple media playback devices is solved by aspects of the embodiments described herein. Advantageously, selecting the nearest device(s) is easier and more efficient.

In the example use case depicted in FIG. 4, to media playback devices, 502-1 and 502-2 are located in a first room (Jev's Dorm Room). However, there are two available speakers available to both mobile playback devices 502-1 and 502-2, named Jev's Speaker and John's Speaker, respectively.

The signal strength between the first speaker (Jev's Speaker) and the second mobile device 502-2 is −25 dBM and the signal strength between the first speaker (Jev's Speaker) and the first mobile device 502-1 is −35 dBM. The signal strength between the second speaker (John's Speaker) and the second mobile device 502-2 is −88 dBM and the signal strength between the second speaker (John's Speaker) and the first mobile device 502-1 is −110 dBM.

Accordingly, in this case, both the first list of device metadata will include both the first and second speakers, but will organize them according to signal strength (which will correlate to distance) and hence list Jev's Speaker at the top of the list of available devices. While this example only illustrates two media playback devices 502-1 and 502-2 and only two speakers, Jev's Speakers and John's Speakers, it should be understood that there could be many more nearby.

Figure 5A:
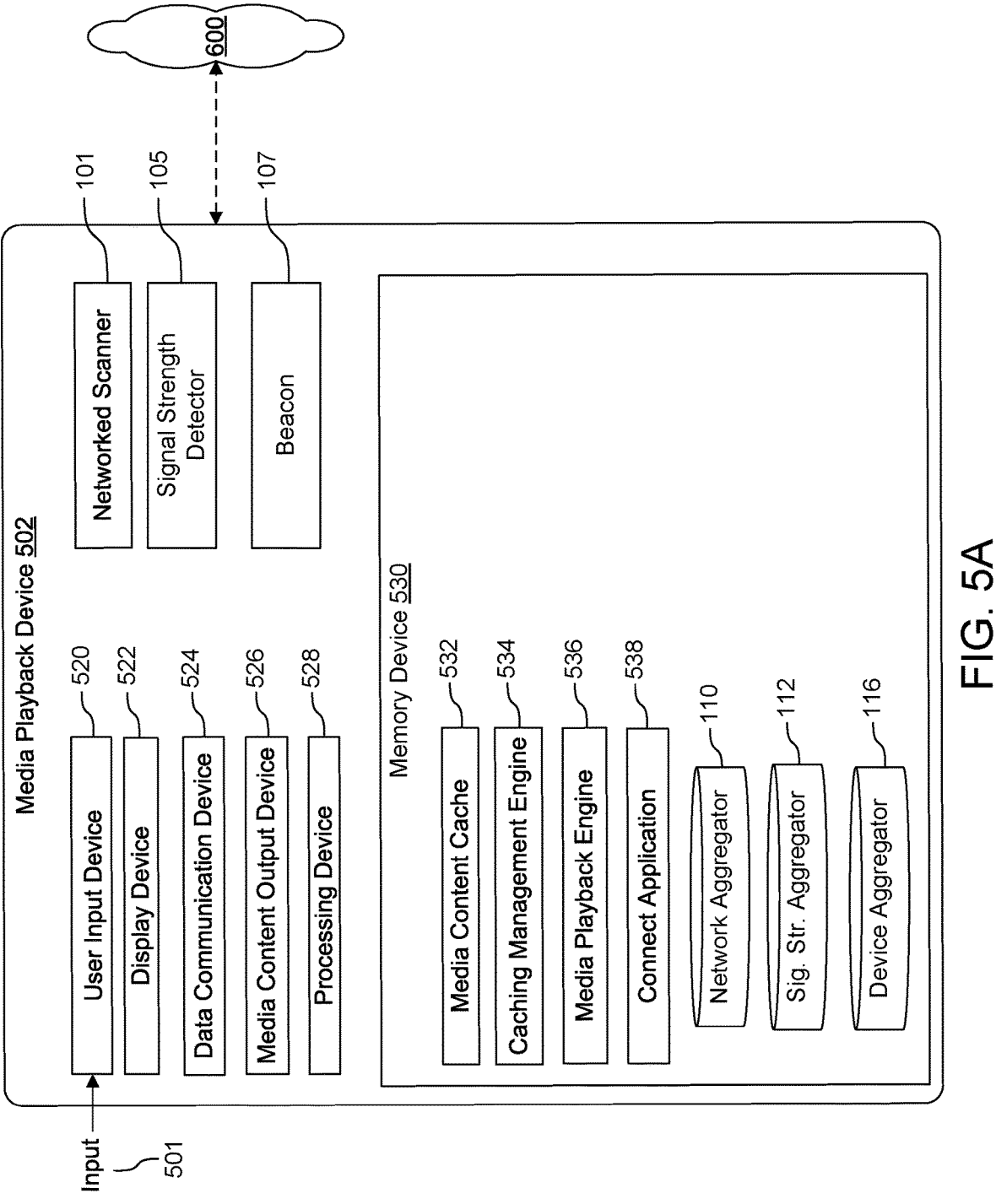
FIG. 5A is a representative view of a portion of a system in which some embodiments may be implemented.
Figure 5B:
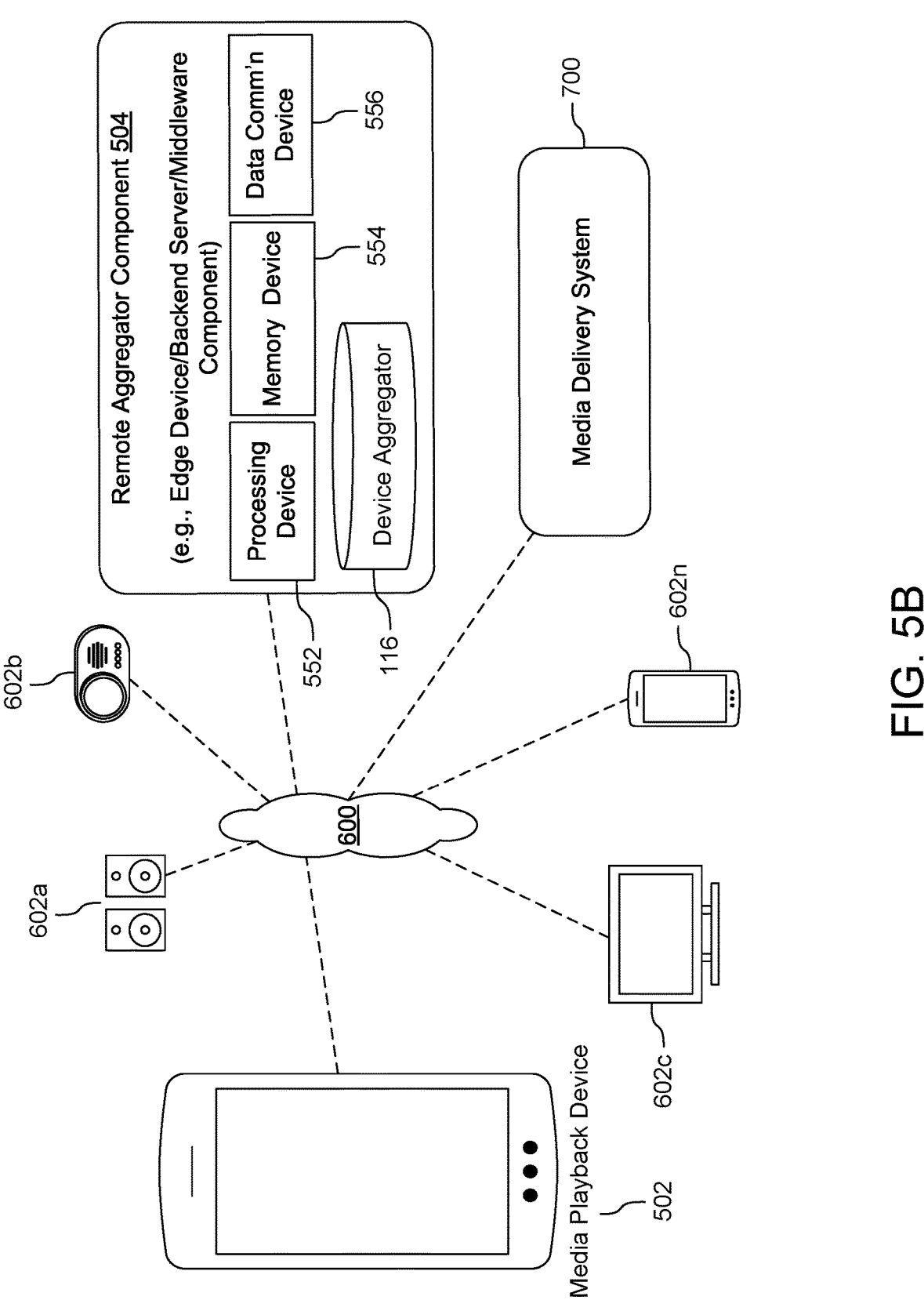
FIG. 5B is a representative view of a portion of a system in which some embodiments may be implemented.

FIG. 5A and FIG. 5B together are a representative view of a system in which some embodiments may be implemented. The system includes an example media playback device 502 and an edge device, remote server, or middleware component, each referred to as a remote aggregator component 504.

The description of media playback device 502 is applicable in relevant respect to devices 602a, 602b, 602c, . . . , 602n (individually and/or collectively referred to as device (s) 602). It may be the case that one or more of devices 602a, 602b, 602c, . . . , 602n has more or fewer features than media playback device 502. In some embodiments, only devices that are compatible with media playback device 502 can be presented via (e.g., the display device) of media playback device 502. For simplicity, the components of an example media playback device 502 will be described.

The media playback device 502 includes a user input device 520, a display device 522, a data communication device 524, a media content output device 526, a processing device 528, a memory device 530, a network scanner 101, a signal strength detector 105 and a beacon 107.

The media playback device 502 operates to play media content. For example, the media playback device 502 is configured to play media content that is provided (e.g., streamed or transmitted) by a system external to the media playback device 502, such as from a media delivery system 700, another system, or a peer device. In other examples, the media playback device 502 operates to play media content stored locally on the media playback device 502. In yet other examples, the media playback device 502 operates to play media content that is stored locally as well as media content provided by other systems.

In some embodiments, the media playback device 502 is a handheld or portable entertainment device, smart speaker, smartphone, tablet, watch, wearable device, or any other type of computing device capable of playing certain types of media content (e.g., audio, video, text, etc.). In other embodiments, the media playback device 502 is a laptop computer, desktop computer, television, gaming console, set-top box, network appliance, BLU-RAY or DVD player, media player, stereo, or radio, etc.

A user input device 520 of media playback device 502 operates to receive a user input from a user for controlling the media playback device 502. The user input can include a manual input and/or a voice input. In some embodiments, the user input device 520 includes one or more buttons, keys, touch levers, switches, and/or other mechanical input devices for receiving the input 501.

In some embodiments, the user input device 520 can detect sounds including the voice input such as a voice of a user (e.g., an utterance) for controlling playback of media content via the media playback device 502.

In some embodiments, a display device 522 is provided that operates to display a graphical user interface that displays information for interacting with the media playback device 502. Examples of such information include media content playback information, notifications, and other information. In some embodiments, the display device 522 is configured as a touch sensitive display and includes the user input device 520 for receiving the input 501 from a selector (e.g., a finger, stylus etc.) controlled by a user. In some embodiments, therefore, the display device 522 operates as both a display device and a user input device.

The data communication device 524 operates to enable the media playback device 502 to communicate with one or more computing devices over one or more networks, such as the network 600. For example, the data communication device 524 is configured to communicate with a media delivery system 700 and receive media content from or via the media delivery system 700 at least partially via the network 600. The data communication device 524 can be a network interface of various types which connects the media playback device 502 to the network 600.

The media content output device 526 operates to output media content (e.g., via one or more speakers which are incorporated in the media playback device 502 or via external speaker such as headphones, a portal speaker, a vehicle entertainment system, etc.). Examples of such external speakers include devices 602.

The processing device 528, in some embodiments, comprises one or more central processing units (CPU). In other embodiments, the processing device 528 additionally or alternatively includes one or more digital signal processors, graphical processing units (GPUs), field-programmable gate arrays, or other electronic circuits.

The memory device 530 typically includes at least some form of non-transitory computer-readable media. Non-transitory computer readable media includes any available media that can be accessed by the media playback device 502, such as volatile and nonvolatile, removable and non-removable media implemented in any device configured to store information such as computer readable instructions, data structures, program modules, or other data. Memory device 530 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 502 in a non-transitory manner.

The memory device 530 operates to store data and instructions. In some embodiments, the memory device 530 stores instructions for a media content cache 532, a caching management engine 534, a media playback engine 536, a connect application 538, a networked-device aggregator 110, a signal strength aggregator 112, and a device aggregator 116.

Some embodiments of the memory device 530 include the media content cache 532. The media content cache 532 stores media content items, such as media content items that have been received from a media delivery system 700. In some embodiments, the media content cache 532 also stores metadata about media content items such as title, artist name, album name, length, genre, mood, era, etc. The media content cache 532 can further store playback information about the media content items and/or other information associated with the media content items.

The caching management engine 534 is configured to receive and cache media content in the media content cache 532 and manage the media content stored in the media content cache 532. In some embodiments, when media content is streamed from the media delivery system 700, the caching management engine 534 operates to cache at least a portion of the media content into the media content cache 532. In other embodiments, the caching management engine 534 operates to cache at least a portion of media content into the media content cache 532 while online so that the cached media content is retrieved for playback while the media playback device 502 is offline.

The media playback engine 536 operates to play media content to a user. As described herein, the media playback engine 536 can, in some implementation, be configured to communicate with a remote aggregator component 504 to receive one or more media content items (e.g., through a media stream). In other embodiments, the media playback engine 536 is configured to play media content that is locally stored in the media playback device 502.

In some embodiments, the media playback engine 536 operates to retrieve one or more media content items that are either locally stored in the media playback device 502 or remotely stored in a media delivery system 700. In some embodiments, the media playback engine 536 is configured to send a request to a media delivery system 700 for media content items and receive information about such media content items for playback.

In some embodiments, networked-device aggregator 110 operates to store a first list of device metadata (e.g., first list of device metadata 104 of FIG. 1, first list of device metadata 201 of FIG. 2) including at least a device identifier.

In some embodiments, signal strength aggregator 112 operates to store the second list of device metadata (e.g., second list of device metadata 106 of FIG. 1, second list of device metadata 202 of FIG. 2).

In some embodiments, a device aggregator 116 is implemented in media playback device 502, where device aggregator 116 operates to store the third list of device metadata (e.g., third list of device metadata 108 of FIG. 1, third list of device metadata 203 of FIG. 2).

In some embodiments, the connect application 538 operates to connect media playback device with one or more of devices 602. In some embodiments, a connect application 538 operates to transfer playback from media playback device 502 to one or more of devices 602. For example, in an example implementation, after receiving a selection of a device identified from the third list of metadata displayed on the display device 522 of the media playback device 502, the selection is communicated to the remote aggregator component 504. In turn remote aggregator component operates to make a connection between the selected device and the media delivery system 700 for media playback. In some embodiments, the remote aggregator component 504 is implemented in media delivery system 700.

Remote aggregator component 504 a device aggregator 116. In some embodiments, the first list of device metadata 104 and the second list of device metadata 106 are communicated to device aggregator 116 that is remote from the media playback device 502. In these embodiments, device aggregator 116 processes the first list of device metadata 104 and the second list of device metadata 106 by combining them into one single list, the third list of device metadata 108.

In at least some embodiments, the remote aggregator component 504 and media playback device 502 are provided by separate computing devices. In other embodiments, the remote aggregator component 504 and the media playback device 502 are provided by the same computing device(s). In such embodiments, it may be the case that only the device aggregator 116 is implemented in the media playback device 502.

In some embodiments, the remote aggregator component 504 includes a processing device 552, a memory device 554, and a data communication device 556. The processing device 552 and the memory device 554 may be similar to the processing device 528 and the memory device 530, respectively, which have each been previously described. Therefore, the description of the processing device 552 and the memory device 554 are omitted for brevity purposes.

The data communication device 556 operates to communicate with other computing devices over one or more networks, such as the network 600. Examples of the data communication device include one or more wired network interfaces and wireless network interfaces.

Media content items may be audio, video, podcasts or any other type of media content, which may be stored in any format for storing media content.

While various example embodiments have been described above, it should be understood that they have been presented by way of example, and not limitation. It will be apparent to persons skilled in the relevant art(s) that various changes in form and detail can be made therein. Thus, the invention presented herein should not be limited by any of the above-described example embodiments but should be defined only in accordance with the following claims and their equivalents.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular examples only and is not intended to be limiting. As used herein, the singular forms "a", "an" and "the" are intended to include the plural forms as well, unless the context clearly indicates otherwise.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given herein are approximate unless stated otherwise, meaning that the term "about" or "approximately" can be inferred when not expressly stated.

Illustrative examples of the disclosure are described below. In the interest of clarity, not all features of an actual implementation are described in this specification. It will of course be appreciated that in the development of any such actual example, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Software embodiments of the example embodiments presented herein may be provided as a computer program product, or software, that may include an article of manufacture on a machine accessible or machine-readable medium having instructions. The instructions on the machine accessible or machine-readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The performance of the one or more actions enables enhanced and automated selection and output of the data corresponding to media content. This means that data which is selected and output according to the processes described herein are of enhanced contextual relevance and in this regard can be automatically selected and output at significantly improved rates, for example the throughput of data selection to its output, or speed of data selection is significantly enhanced. The data which is automatically selected and output according to the processes described herein can thus be pre-emptively obtained and stored locally within a computer, or transmitted to the computer, such that the selected data is immediately accessible and relevant to a local user of the computer.

Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for displaying a listing of connected devices, comprising:

obtaining a first list of device metadata including first device identifiers corresponding to devices that are connected to a local network and enabled to stream media content items;

scanning, by a wireless signal strength detector associated with a media playback device, for one or more devices estimated to be within a predefined physical distance of the media playback device;

generating a second list of device metadata including second device identifiers corresponding to the one or more devices within the predefined physical distance;

generating a third list of device metadata corresponding to an overlap of the first list of device metadata and the second list of device metadata, wherein the overlap is determined by one or more device identifiers that are included in the first device identifiers and the second device identifiers; and displaying, via a display interface of the media playback device, at least a portion of the third list of device metadata.

2. The method according to claim 1, further comprising:

communicating the first list of device metadata and the second list of device metadata to a device aggregator that is remote from the media playback device, wherein the device aggregator is implemented in one of (i) an edge device, (ii) a remote server, or (iii) a middleware component; and receiving, by the media playback device from the device aggregator, the third list of device metadata.

3. The method of claim 1, wherein the third list of device metadata is ordered based on one or more received signal strength detectors corresponding to the one or more devices within the predefined physical distance in the second list of device metadata.

4. The method of claim 1, wherein each of the one or more devices estimated to be within the predefined physical distance is any one of (i) a Bluetooth (BT) enabled device, (ii) an ultra-wideband (UWB) enabled device, or (iii) a combination of (i) and (ii), and wherein the third list of device metadata is ordered based on one or more received signal strength detectors corresponding to the one or more BT enabled devices and the one or more UWB enabled devices in the second list of device metadata.

5. The method of claim 1, wherein the predefined physical distance is adjustable via a user interface of the media playback device.

6. The method of claim 1, wherein each of the first device identifiers and the second device identifiers is (i) a device name, (ii) an Internet Protocol (IP) address, (iii) a location identifier, or (iv) a unique identifier other than (i), (ii) or (iii).

7. The method of claim 1, wherein the third list of device metadata includes a device characteristic.

8. The method of claim 1, further comprising:

receiving a selection of a device identified from the third list of device metadata displayed on the display interface of the media playback device, thereby receiving a selected device; and establishing a connection between the media playback device and the selected device for media playback.

9. The method of claim 1, further comprising:

receiving a selection of a device identified from the third list of device metadata displayed on the display interface of the media playback device, thereby receiving a selected device;

communicating the selection to a media delivery system; and establishing a connection between the selected device and the media delivery system for media playback.

10. The method of claim 1, wherein: the first list of device metadata is in a first sequence; the second list of device metadata is in a second sequence, the second sequence being at least in part different from the first sequence; and the third list of device metadata ordered based on the second sequence.

11. A system for displaying a listing of connected devices, comprising:

one or more processors; and memory storing one or more programs including instructions configured to be executed by the one or more processors and causing the one or more processors to:

obtain a first list of device metadata including first device identifiers corresponding to devices that are connected to a local network and enabled to stream media content items;

scan, by a wireless signal strength detector associated with a media playback device, for one or more devices estimated to be within a predefined physical distance of the media playback device;

generate a second list of device metadata including second device identifiers corresponding to the one or more devices within the predefined physical distance;

generate a third list of device metadata corresponding to an overlap of the first list of device metadata and the second list of device metadata, wherein the overlap is determined by one or more device identifiers that are included in the first device identifiers and the second device identifiers; and display, via a display interface of the media playback device, at least a portion of the third list of device metadata.

12. The system according to claim 11, the one or more programs further including instructions for causing the one or more processors to:

communicate the first list of device metadata and the second list of device metadata to a device aggregator that is remote from the media playback device, wherein the device aggregator is implemented in one of (i) an edge device, (ii) a remote server, or (iii) a middleware component; and receive, by the media playback device from the device aggregator, the third list of device metadata.

13. The system according to claim 11, wherein the third list of device metadata is ordered based on one or more received signal strength detectors corresponding to the one or more devices within the predefined physical distance in the second list of device metadata.

14. The system according to claim 11, wherein each of the one or more devices estimated to be within the predefined physical distance is any one of (i) a Bluetooth (BT) enabled device, (ii) an ultra-wideband (UWB) enabled device, or (iii) a combination of (i) and (ii), and wherein the third list of device metadata is ordered based on one or more received signal strength detectors corresponding to the one or more BT enabled devices and the one or more UWB enabled devices in the second list of device metadata.

15. The system according to claim 11, wherein the predefined physical distance is adjustable via a user interface of the media playback device.

16. The system according to claim 11, wherein each of the first device identifiers and the second device identifiers is (i) a device name, (ii) an Internet Protocol (IP) address, (iii) a location identifier, or (iv) a unique identifier other than (i), (ii) or (iii).

17. The system according to claim 11, wherein the third list of device metadata includes a device characteristic.

18. The system according to claim 11, the one or more programs further including instructions for causing the one or more processors to:

receive a selection of a device identified from the third list of device metadata displayed on the display interface of the media playback device, thereby receiving a selected device; and establish a connection between the media playback device and the selected device for media playback.

19. The system according to claim 11, the one or more programs further including instructions for causing the one or more processors to:

receive a selection of a device identified from the third list of device metadata displayed on the display interface of the media playback device, thereby receiving a selected device;

communicate the selection to a media delivery system; and establish a connection between the selected device and the media delivery system for media playback.

20. The system according to claim 11, wherein: the first list of device metadata is in a first sequence; the second list of device metadata is in a second sequence, the second sequence being at least in part different from the first sequence; and the third list of device metadata ordered based on the second sequence.

* * * * *